United States Patent
Sager et al.

[15] 3,660,186
[45] May 2, 1972

[54] METHOD FOR BONDING WEBS EMPLOYING ULTRASONIC ENERGY

[72] Inventors: Karl E. Sager, Appleton; Howard N. Nelson, Neenah, both of Wis.

[73] Assignee: Kimberly-Clark Corporation, Neenah, Wis.

[22] Filed: Apr. 8, 1969

[21] Appl. No.: 814,383

[52] U.S. Cl..............................156/73, 156/291, 156/305, 156/324
[51] Int. Cl........................................................B32b 31/16
[58] Field of Search...............156/73, 321, 290, 291, 305, 156/324

[56] References Cited

UNITED STATES PATENTS

| | | | |
|---|---|---|---|
| 3,483,073 | 12/1969 | Pounder et al............................156/73 |
| 3,214,323 | 10/1965 | Russell et al............................156/324 |
| 3,224,915 | 12/1965 | Balamuth et al.........................156/73 |
| 3,222,235 | 12/1965 | Buchner...................................156/73 |
| 3,242,029 | 3/1966 | Deans....................................156/73 X |
| 2,633,894 | 4/1953 | Carwile....................................156/73 |
| 2,712,174 | 7/1955 | Hubbell..............................156/305 X |
| 3,485,699 | 12/1969 | Bassett et al...........................156/290 |
| 3,514,355 | 5/1970 | Welin-Berger........................156/291 |

FOREIGN PATENTS OR APPLICATIONS 765,344  1/1957  Great Britain..........................156/73

Primary Examiner—Carl D. Quarforth
Assistant Examiner—R. L. Tate
Attorney—Wolfe, Hubbard, Leydig, Voit & Osann, Ltd

[57] ABSTRACT

A continuous method for bonding or seaming running webs wherein a moving arcuate surface serves as an anvil against which a sonic horn can work while at the same time supplying a bonding medium to the webs as they pass under the horn, and to apparatus for carrying out such a method. In one embodiment, the arcuate surface is designed to provide a seam which simulates a series of stitches.

9 Claims, 3 Drawing Figures

PATENTED MAY 2 1972 3,660,186

INVENTORS.
KARL E. SAGER,
HOWARD N. NELSON
BY Wolfe, Hubbard, Voit & Osann
ATTORNEYS.

METHOD FOR BONDING WEBS EMPLOYING ULTRASONIC ENERGY

DESCRIPTION OF THE DISCLOSURE

This invention relates to the joining of webs and, more particularly, to the sonic bonding or seaming of such materials.

Nonwoven webs used alone or in combination with other materials are coming into widespread use for a variety of disposable products, such as disposable garments of all types, because of their relative low cost of manufacture. Typically, these nonwoven materials comprise one or more layers of cellulosic tissue or wadding with a nonwoven layer or scrim serving to increase the strength of the material in the machine and/or cross direction. Materials of this type are conventionally adhesively bonded together to form a laminate.

To bond such a laminate to another web, the nonwoven web may be heated to the temperature range needed to reactivate the adhesive and the webs to be joined are then brought together. This type of bonding has not, however, been altogether successful, for, in some situations, there has been an insufficient amount of adhesive to effectively bond the webs together. This also requires that the adhesive be exposed to a source of heat for a time sufficient to cause reactivation. This may restrict the speeds at which this method of bonding may be employed as well as presenting potential problems of achieving release from any supporting surface.

Similarly, in forming facial wipes and the like, generally two plies of creped paper are slit to the desired width and bonded together by the development of hydrogen bonds. The slitter normally works against a metallic base member and this arrangement cannot provide adequate bonding at the conventional high speeds normally encountered in the papermaking industry.

It is accordingly an object of the present invention to provide a method and means for bonding webs employing vibratory energy that can be efficiently carried out at high production rates.

It is another object of the invention to provide a method and means for joining together webs that are independent of the amount of bonding medium in the webs that may be reactivated.

A further object of the invention is to provide a method and means for automatically supplying the bonding medium to the webs being joined.

Yet another object of the invention is to provide a method and means for simultaneously bonding and slitting a web.

A still further object of the invention is to provide a method and means that is capable of forming a series of simulated stitches.

Other objects and advantages of the invention will be apparent from the following detailed description taken in conjunction with the accompanying drawings, in which.

Figure 1:
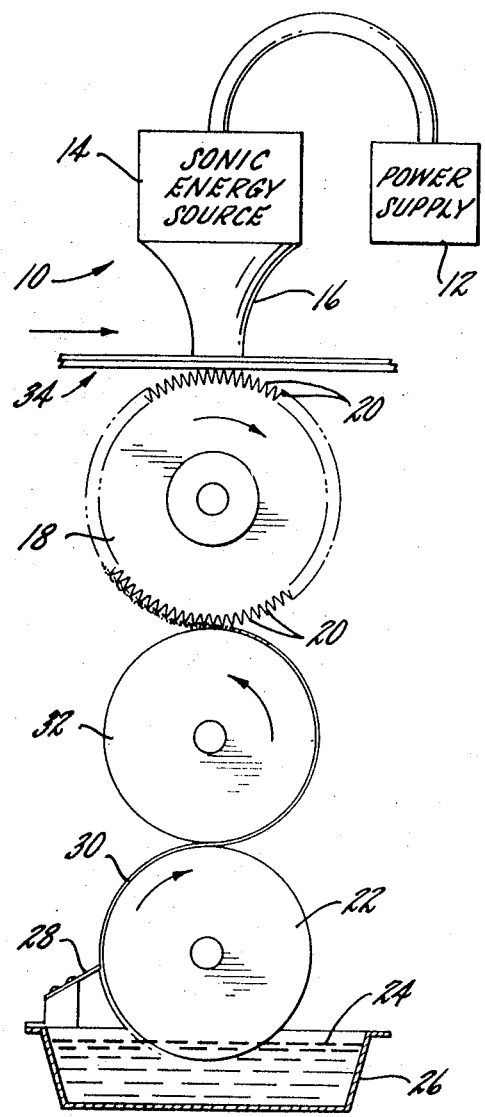
FIG. 1 is a schematic side elevation of one exemplary embodiment of the present invention.

While the invention is susceptible of various modifications and alternative forms, certain specific embodiments thereof have been shown by way of example in the drawings which will be described in detail herein. It should be understood, however, that it is not intended to limit the invention to the particular forms disclosed, but, on the contrary, the intention is to cover all modifications, equivalents, and alternatives falling within the spirit and scope of the invention. For example, while the illustrative embodiment is described in connection with bonding together two or more webs to form laminates, it should be readily apparent that the present invention is equally applicable to bonding the fibers or other discrete elements of a single web to increase the integrity thereof. Thus, by employing a series of laterally spaced energy sources together with a moving arcuate surface in intermittent contact with the web and an adhesive supply, in accordance with the present invention, the filaments of a conventionally formed spun web may be spot bonded.

Turning to the drawings, FIG. 1 illustrates one exemplary embodiment for carrying out the present invention. A conventional sonic energy source is shown generally at 10. The energy source may be designed with a frequency which may vary from a few thousand cycles per second up to perhaps one million cycles per second or more. However, to minimize the problem of audible noise and to provide an efficient source of energy, it is preferred to employ an ultrasonic energy source that is capable of providing at least about 20,000 cycles per second. Typically, the energy source 10 will include a power supply 12 capable of providing the necessary electrical energy and a converter 14 for converting the electrical energy into mechanical energy in the form of vibrations. The converter 14 may be a piezoelectric element made of materials such as barium titanate or lead zirconate titanate.

A horn 16 is employed to transmit the mechanical vibrations from the converter 14 to the webs being assembled. The mass and shape of the horn determines the length at which the horn will oscillate at the optimum frequency determined by the power supply. The energy source 10 thus provides, within the region of the horn, an intense, localized zone of sonic energy. The horn is positioned to come into contact with the upper web of the webs that are to be bonded.

A moving arcuate surface is provided to serve as an anvil against which the sonic horn can work and to contact the other side of the superposed webs as they move through this zone. To this end, there is provided a rotatable disc 18 having a plurality of serrated teeth 20 located about its periphery. As an example, the serrated disc or wheel may have a diameter within the range of from about 4 to about 12 inches and each of the teeth may have a surface area at its extremity of from about 0.0002 to about 0.002 square inches.

In accordance with the present invention, the moving arcuate surface supplies the desired amount of the bonding medium to the webs in the zone of the localized sonic energy. This makes the bonding independent of the amount of reactivated adhesive or bonding medium present in the webs being joined. To this end and as shown in FIG. 1, a pan roller 22 rotates in an adhesive solution 24 contained in a pan 26. The amount of adhesive carried by the roll 22 may be adjusted by a doctor blade 28. The adhesive 30 is then sequentially transferred to roll 32 and the serrated disc 18. The disc carries the adhesive and brings it into contact with a plurality of webs, generally indicated at 34, as the webs reach the zone of sonic energy under horn 16. The adhesive penetrates the webs 34 to form a simulated stitch at each serration and the webs also tend to wipe the disc clean. Heat is developed which serves to set the adhesive and make it non-tacky as it leaves the energy zone.

Figure 2:
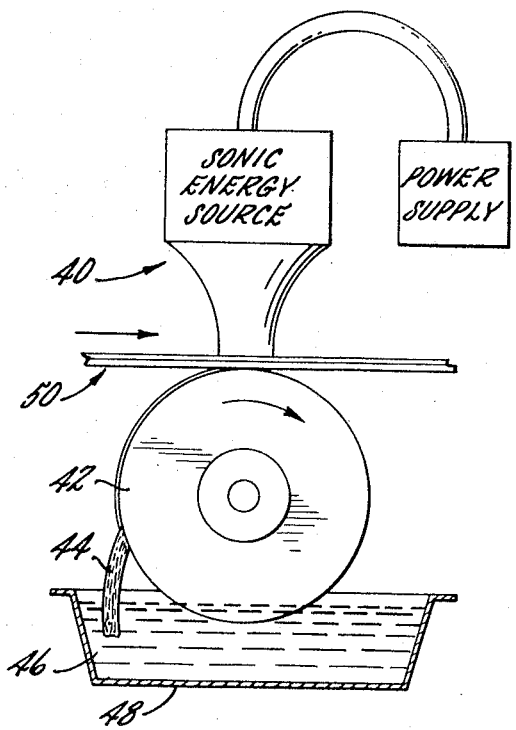
FIG. 2 is a schematic side elevation of a further embodiment of the present invention.

FIG. 2 illustrates an exemplary apparatus for carrying out the present invention in connection with cellulosic webs capable of developing hydrogen bonds. The webs may be simultaneously slit and bonded at high speeds. The sonic energy source 40 may be identical to the one described in connection with the embodiment of FIG. 1.

In this embodiment and in accordance with the present invention, the moving arcuate surface supplies an aqueous solution to the webs in the zone of sonic energy. Thus, a conventional score slitter 42 is provided with a cooperating wick 44 that supplies the slitter 42 with a predetermined amount of an aqueous solution from the solution 46 which is contained in pan 48.

As the slitter rotates, the aqueous solution carried on its edge is absorbed by the cellulosic webs 50. The residence time can be adjusted so the webs are simultaneously slit and bonded through the development of hydrogen bonds along the line formed by the continuous line of contact between the slitter 42 and the bottom web.

It should be appreciated that, if desired, the residence time of the webs in the energy zone could be modified to continuously bond without also slitting in the FIG. 2 embodiment. In the apparatus shown in FIG. 1, it should similarly be appreciated that the serrated disc could be replaced by a smooth one to provide a continuous seam. Lengthening of the residence time may also be employed in the FIG. 1 embodiment to provide simultaneous slitting and adhesive bonding. Additionally, the score slitter of FIG. 2 could be replaced by the serrated disc of FIG. 1 to achieve, by adjusting the residence time, "perfing" operation (e.g. perforating to enable easy separation such as is done with various types of towelling and wipes). Thus, the present invention could simultaneously carry out bonding and "perfing."

While water alone could be employed as the bonding medium for developing the hydrogen bonds, it is preferred to employ an oil-water soluble emulsion. A specific example of an oil that can be suitably employed is "CITGO CHX—313 Soluble Oil," manufactured by the Cities Service Oil Company, New York, New York. This oil has the following properties: gravity, °API—33.0; flash point, °F min.—380; fire point, °F min.—430; viscosity index min. — 94; pour point, °F min. — +5; color ASTM 1,500 max. —1; pounds per gallon — 7.167; carbon residue % max. — 0.03; and aniline point °F— 220.

Figure 3:
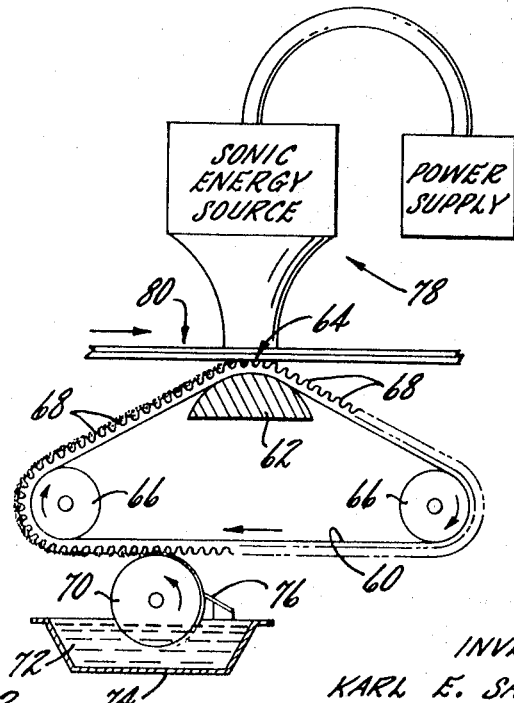
FIG. 3 is a schematic side elevation of a still further embodiment of the present invention.

Rather than employing a rotating disc or roll as the moving arcuate surface, a belt moving over a stationary arcuate surface may be utilized. To this end and as shown in FIG. 3, an endless belt 60 is provided which moves over a stationary support and anvil 62 having an arcuate surface as indicated at 64. Movable guide rolls 66 allow the belt 60 to be tensioned as desired. To carry adhesive to the zone where bonding takes place, the surface of the belt 60 may be provided with a series of projections 68. Adhesive is supplied to the belt 60 by a roll 70 which rotates in an adhesive solution 72 contained in a pan 74. A doctor blade 76 may be used to adjust the amount of adhesive carried by the roll. A sonic energy source 78 of the type previously described provides the desired vibratory motion to effect the bonding of the webs 80 as they pass through the zone of localized sonic energy.

It should be appreciated that any known adhesive can be employed in the process of the present invention. When nonwoven materials are being bonded it has been found to be advantageous to use plastisols. While many adhesives of this nature are known, those particularly useful for incorporation in the product include vinyl chloride polymers, and copolymers of vinyl chloride with other vinyl resins, plasticized by organic phthalates, sebacates, or adipates. These combinations provide a fast-curing plastisol adhesive characterized by relatively low viscosity, low migration tendencies, and minimum volatility. Such adhesives remain soft and flexible after curing, can be reactivated by application of heat and pressure, such as by hot-calendering and insure that the resultant laminated product retains the desired softness, and proper hand and feel. Other adhesives such as polyvinyl acetate, acrylic resins such as the alkyl acrylates and butadiene resins such as butadiene-styrene and butadiene acrylonitriles can also be employed.

The present invention, while finding obvious utility in connection with nonwoven laminates such as have been hereinbefore described, may also be employed with cellulosic wadding, knit, foam film and woven materials. The term "web," as used herein and in the claims which follow, is meant to include any material, whether a laminate or a single layer of material, which is capable of absorbing a bonding medium so that the bonding or seaming can be effected.

Thus, as has been seen, this invention provides a versatile process and apparatus for bonding or seaming which can be carried out at high speeds. Employing a moving arcuate surface to supply the bonding medium to the webs being joined makes the process independent of the amount of adhesive already present in the webs. The versatility of the process is exhibited by the following operations, all of which may be carried out by using the present invention: continuously bonding and slitting, "perfing" and bonding, and intermittently bonding to form simulated stitches for forming disposable garments and the like. Additionally, instead of employing a narrow line of treatment as hereinbefore described, the present invention could be utilized to spot bond webs.

We claim as our invention:

1. A method of bonding webs which comprises forwarding a plurality of webs to a zone wherein localized sonic energy may be applied positioning a moving arcuate surface against one of the webs to serve as an anvil against which the sonic energy can work, supplying predetermined amounts of a bonding medium to the moving arcuate surface applying localized sonic energy in said zone, transferring the bonding medium carried by the arcuate surface to the webs as the localized sonic energy is applied in said zone to set said bonding medium and thereby bond together said webs, and removing the bonded webs from the zone.

2. The method of claim 1 wherein the moving arcuate anvil surface intermittently contacts the web so that said bonding medium is transferred to said web in a predetermined pattern.

3. The method of claim 1 wherein the moving arcuate surface is substantially in continuous contact with the web.

4. The method of claim 1 wherein the localized sonic energy is applied by a horn, the webs are passed between the horn and the moving arcuate anvil surface, and the bonding medium is water.

5. The method of claim 1 wherein the bonding medium is an adhesive.

6. The method of claim 1 wherein at least one of the webs is a nonwoven material.

7. The method of claim 1 wherein the zone of sonic energy provides at least about 20,000 cycles per second.

8. A method of bonding a web formed from discrete elements which comprises forwarding the web to a plurality of zones spatially disposed across the lateral dimension of the web wherein localized sonic energy may be applied, positioning a moving arcuate surface in each zone and against the web to serve as anvils against which sonic energy can work, supplying predetermined amounts of a bonding medium to each of the moving arcuate surfaces, applying localized sonic energy in said zones, transferring the bonding medium carried by the arcuate surfaces to the web as the localized sonic energy is applied in said zone to set said bonding medium and to thereby bond the discrete elements together and removing the bonded web from the zone.

9. The method of claim 1 wherein the moving arcuate anvil surface is positioned so that said moving arcuate anvil surface supports the web and transfers the bonding medium to the web as the localized sonic energy is applied in said zones.

* * * * *

PO-1050
(5/69)

UNITED STATES PATENT OFFICE
CERTIFICATE OF CORRECTION

Patent No. 3,660,186     Dated May 2, 1972

Inventor(s) Karl E. Sager and Howard N. Nelson

It is certified that error appears in the above-identified patent and that said Letters Patent are hereby corrected as shown below:

In the Claims:

Claim 1, line 2, after "webs" insert --in an overlapping relationship--;

line 3, after applied insert a comma (,);

line 6, after surface insert a comma (,).

Signed and sealed this 6th day of February 1973.

(SEAL)
Attest:

EDWARD M. FLETCHER, JR.
Attesting Officer

ROBERT GOTTSCHALK
Commissioner of Patents